United States Patent
Wang et al.

(10) Patent No.: US 7,423,652 B2
(45) Date of Patent: Sep. 9, 2008

(54) APPARATUS AND METHOD FOR DIGITAL VIDEO DECODING

(75) Inventors: Jiunn-Shyang Wang, Hsin-Tien (TW); Andy Chiu, Hsin-Tien (TW)

(73) Assignee: Via Technologies Inc., Taipei County (TW)

( * ) Notice: Subject to any disclaimer, the term of this patent is extended or adjusted under 35 U.S.C. 154(b) by 158 days.

(21) Appl. No.: 11/441,012

(22) Filed: May 26, 2006

(65) Prior Publication Data

US 2006/0267996 A1    Nov. 30, 2006

(30) Foreign Application Priority Data

May 27, 2005    (TW) ................ 94117572 A

(51) Int. Cl.
*G06T 15/00* (2006.01)
(52) U.S. Cl. ............ 345/558; 358/530; 358/539; 382/236
(58) Field of Classification Search ........ 345/558; 358/530, 539; 382/236
See application file for complete search history.

(56) References Cited

U.S. PATENT DOCUMENTS 5,168,375 A * 12/1992 Reisch et al. ............... 382/250
5,611,038 A * 3/1997 Shaw et al. ............. 715/500.1
6,272,257 B1 * 8/2001 Prokop ................... 382/246

FOREIGN PATENT DOCUMENTS

JP    2005057688    3/2005

OTHER PUBLICATIONS

Wallace, The IPEG Still Image Compression Standard, Communications of the ACM—Apr. 1991, pp. 31-44.*

* cited by examiner

*Primary Examiner*—Phu K Nguyen
(74) *Attorney, Agent, or Firm*—Rosenberg, Klein & Lee

(57) ABSTRACT

The decoding method is disclosed. The steps of the method includes recording each status of a plurality of data blocks of compressed macroblocks indicated by a first pointer to a first pointer storage area and each status of a plurality of data blocks of compressed inter-macroblocks indicated by a second pointer to a second pointer storage area; decoding the data blocks of compressed macroblocks according to the first pointer storage area and the data blocks of compressed inter-macroblocks according to the second pointer storage area; and outputting the decoded data blocks to an inverse quantization unit and an inverse discrete cosine transform unit.

14 Claims, 6 Drawing Sheets

| DC | 0 | 0 | 1 | 1 | 1 | 2 | 2 |
|----|---|---|---|---|---|---|---|
| 0  | 0 | 1 | 1 | 1 | 2 | 2 | 2 |
| 0  | 1 | 1 | 1 | 2 | 2 | 2 | 3 |
| 1  | 1 | 1 | 2 | 2 | 2 | 3 | 3 |
| 1  | 1 | 2 | 2 | 2 | 3 | 3 | 3 |
| 1  | 2 | 2 | 2 | 3 | 3 | 3 | 3 |
| 2  | 2 | 2 | 3 | 3 | 3 | 3 | 3 |
| 2  | 2 | 3 | 3 | 3 | 3 | 3 | 3 |

Fig. 2A (prior art)

| DC | 0 | 1 | 1 | 1 | 2 | 2 | 3 |
|----|---|---|---|---|---|---|---|
| 0  | 1 | 1 | 2 | 2 | 2 | 3 | 3 |
| 1  | 1 | 2 | 2 | 2 | 3 | 3 | 3 |
| 1  | 2 | 2 | 2 | 3 | 3 | 3 | 3 |

| 0 | 0 | 1 | 1 | 2 | 2 | 2 | 3 |
|---|---|---|---|---|---|---|---|
| 0 | 1 | 1 | 2 | 2 | 2 | 3 | 3 |
| 1 | 1 | 2 | 2 | 2 | 3 | 3 | 3 |
| 1 | 2 | 2 | 3 | 3 | 3 | 3 | 3 |

Fig. 2B (prior art)

APPARATUS AND METHOD FOR DIGITAL VIDEO DECODING

FIELD OF THE INVENTION

The present invention relates to a method for digital video decoding, in particular, to the method for digital video decoding according to pointer storage areas indicated by pointers.

BACKGROUND OF THE INVENTION

For the higher demand in multimedia quality and function of entertainment and consumer electronic devices, the tendency of the multimedia technology is toward high speed and efficient computation. The related hardware and software resources become essential to the real-time audio and video signal processing development. Hence, the design and manufacture of multimedia product tend to low cost, high mobility, and so on.

In general, the multimedia signals consume more resources for storage requirement, and a number of different image compression standards such as DV (digital video) standard specified in the ISO/IEC 61834, the "Blue Book", and the SMPTE 314 specification, for encoding video content have been used. The device employs the DV format classifying pixels into blocks during encode stage in some mathematical way such as a DCT (discrete cosine transformation) technique for DCT block obtainment, compressed data representation in DCT coefficient, and loss reduction of image retrieval in quantization, whereas a decoder of the device performs reverse procedure for approximate DCT coefficient retrieval during decode stage.

Besides, the video data stream with the DV format includes several digital video frames have thirty segments with five macro-blocks respectively. Moreover, each macro-block has a quantization number "QNO", four 14 bytes-luminance blocks Y0 to Y3 respectively, and two 10 bytes-chrominance blocks Cr and Cb respectively. Hence, each abovementioned block includes a set of fixed length information such as the DC coefficients and the 8 by 8 block of DCT coefficients through performing the DCT transform of the AC coefficients of the video image. It's noted that the number of bits required to represent the DCT coefficients of each block should be different for respective quantization coding mode. Accordingly, for the fixed size allocation policy, each block will fall into one of following situations: space redundancy and lack.

With reference to FIG. 1, a schematic diagram showing a conventional DV system 10 which receives a DV format data stream from the DV data stream source such as a DTV (digital television), an interactive STB (set-top box), a DV camera and other device that produces the DV stream. The DV format data stream is divided and transmitted as DIF (digital interface format) sequences which is composed of an integral number of fixed length DIF blocks having an identification header for each DIF block that specifies the type of the DIF block and its position in the DIF sequence. Moreover, the DV system 10 includes a DIF Parser 110 for parsing and separating the DIF data into a DV video data stream which is passed to a video decoder 120 for decoding and a DV audio data stream which is passed to an audio decoder 130 for decoding. Later, the decoded video and audio may be represented to the user by displaying on a display and playing on a speaker respectively. In addition, the video decoder 120 further includes a processor 140 for performing the procedure of pre-parse, inverse quantization, and inverses DCT, and a VLD (variable length decoder) 150.

Each frame is divided into several data blocks and then grouped as the "macro-blocks". During the DV encoding stage, each block is encoded using either an 8 by 8 DCT or 2 by 4 by 8 DCT to produce DCT coefficients of per data block which will be weighted later. Herein, each data block of DCT coefficients is classified into one of four classes with the class number ranged from zero to three, and each coefficient of the data block of DCT coefficients is assigned an area number ranged from zero to three. Accordingly, the FIG. 2A shows the assignment of area numbers to each coefficient in a DCT coefficient matrix while an 8 by 8 DCT is used, and the FIG. 2B shows the assignment while a 2 by 4 by 8 DCT is implemented. In other words, the DCT coefficients are subjected to the quantization procedure for influencing the amount of compressed data accessing and transmitting. The division of each DCT coefficients is determined on the class number, area number and quantization number during quantization stage. It's noted that the quantization number limited the amount of data in one video segment to five compressed macro-blocks in the DV format. Besides, the data block information is passed to the VLD unit during DV decoding so that each data block is decoded to obtain the DCT coefficient which is then passed to the inverse quantization unit and the inverse DCT unit and outputted to the frame storage area for displaying. Herein, the decoding of data block with variable length during a time unit will be inefficient since the digital video is passed to the DV decoder in a constant bit rate.

SUMMARY OF THE INVENTION

In view of the foregoing, the invention is to provide a method for decoding a digital video.

Steps of the decoding method includes recording each status of a plurality of data blocks of compressed macroblocks indicated by a first pointer to a first pointer storage area and each status of a plurality of data blocks of compressed inter-macroblocks indicated by a second pointer to a second pointer storage area; decoding the data blocks of compressed macroblocks according to the first pointer storage area and the data blocks of compressed inter-macroblocks according to the second pointer storage area; and outputting the decoded data blocks to an inverse quantization unit and an inverse discrete cosine transform unit.

An apparatus for decoding a digital video includes a compressed video buffer coupled to a parser for accessing a plurality of compressed digital video data; and an inverse arrangement unit coupled to the compressed video buffer for decoding the compressed digital video data. The inverse arrangement unit further comprises a pointer storage area for storing each status of data blocks and a variable length decode unit for decoding the compressed digital video data according to the pointer storage area.

In addition, the invention further comprises accessing a size of each data block of each compressed macro-block of each video segment of the digital video in the plurality of indicator storage areas.

BRIEF DESCRIPTION OF THE DRAWINGS

The invention will become more fully understood from the detailed description given herein below illustration only, and thus is not limitative of the present invention, and wherein:

FIG. 2A is a schematic diagram showing the assignment of area numbers to each coefficient in a DCT coefficient matrix while an 8*8 DCT is used according to the prior art;

FIG. 2B is a schematic diagram showing the assignment while a 2*4*8 DCT is implemented according to the prior art;

DESCRIPTION OF THE PREFERRED EMBODIMENTS

The present invention will be apparent from the following detailed description, which proceeds with reference to the accompanying drawings, wherein the same references relate to the same elements.

Figure 1:
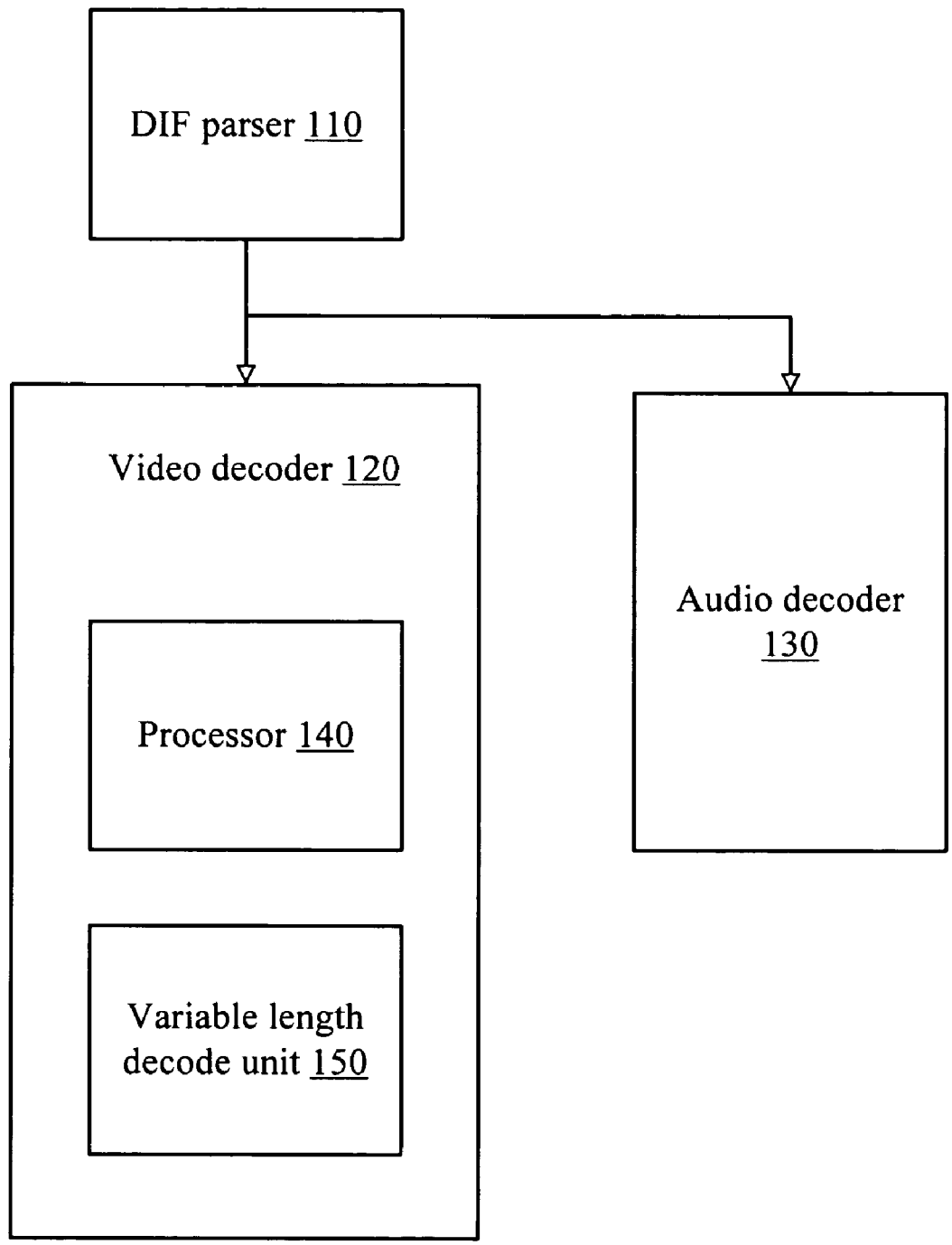
FIG. 1 is a schematic diagram showing the conventional DV system according to the prior art.
Figure 3:
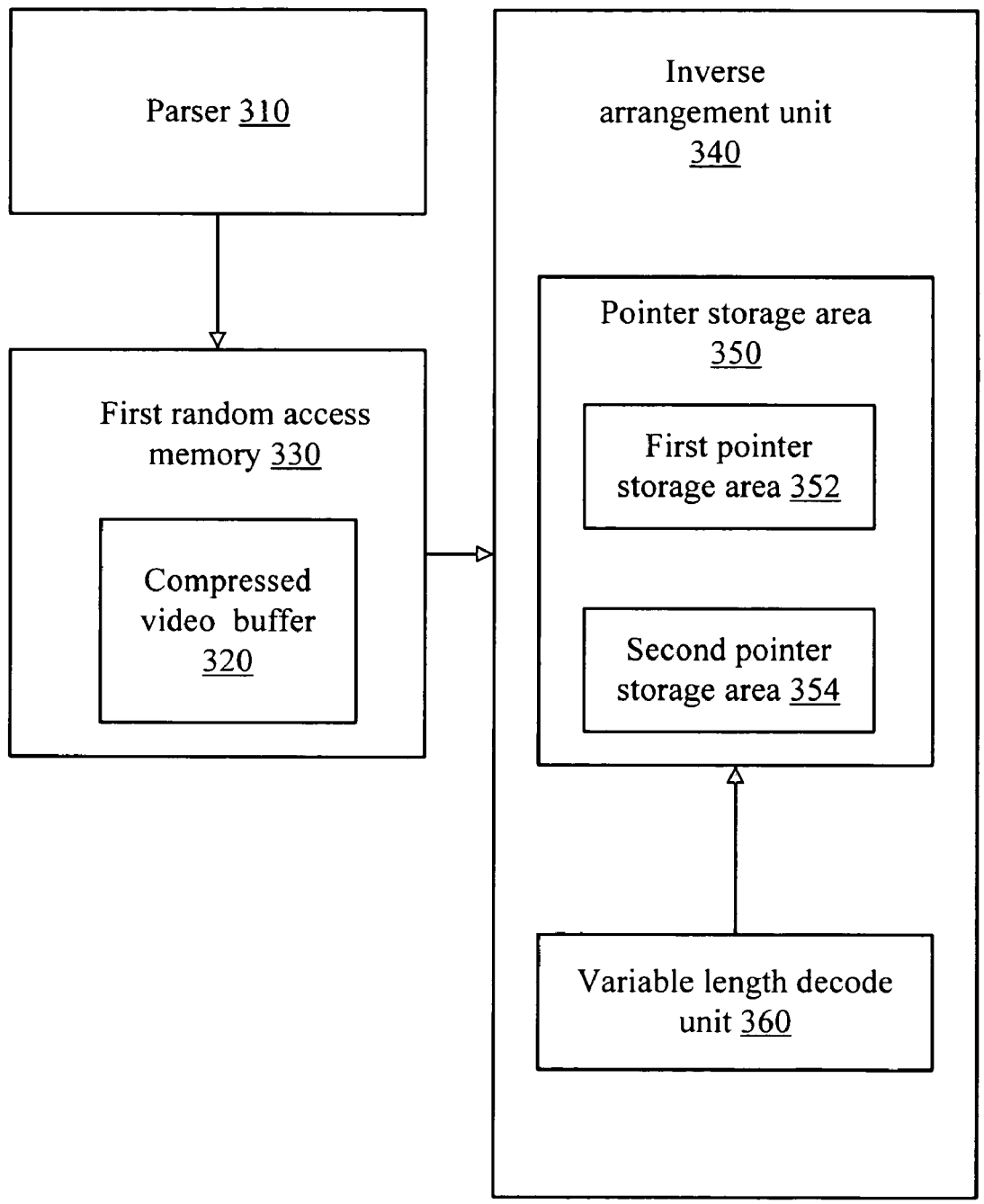
FIG. 3 is a block diagram showing the digital video decoding apparatus for decoding a digital video according to one preferred embodiment of the invention.

As shown in the FIG. 3, a digital video decoding apparatus 300 includes a parser 310, a compressed video buffer 320 allocated in a first random access memory (RAM) 320, and an inverse arrangement unit 340. The inverse arrangement unit 340 includes a pointer storage area 350 with a first pointer storage area 352 and a second pointer storage area 354 and a variable length decoded unit 360. The parser 310 receives and parses a compressed video data stream to compressed video data and compressed audio data. The compressed video buffer 320 stores a plurality of video data arranged in a plurality of data blocks of macro blocks. The inverse arrangement unit 340 is performed for decoding the data blocks. The pointer storage area 350 accesses each status of the data blocks from the compressed macroblocks and the compressed inter-macroblocks indicated by a first pointer to the first pointer storage area 352 and indicated a second pointer to the second pointer storage area 354. The variable length decode unit 360 decodes the compressed video data from the compressed video buffer 320. In this embodiment, each of the first pointer storage area 352 and the second pointer storage area 354 may be implemented in FIFO queue.

Figures 4, 5:
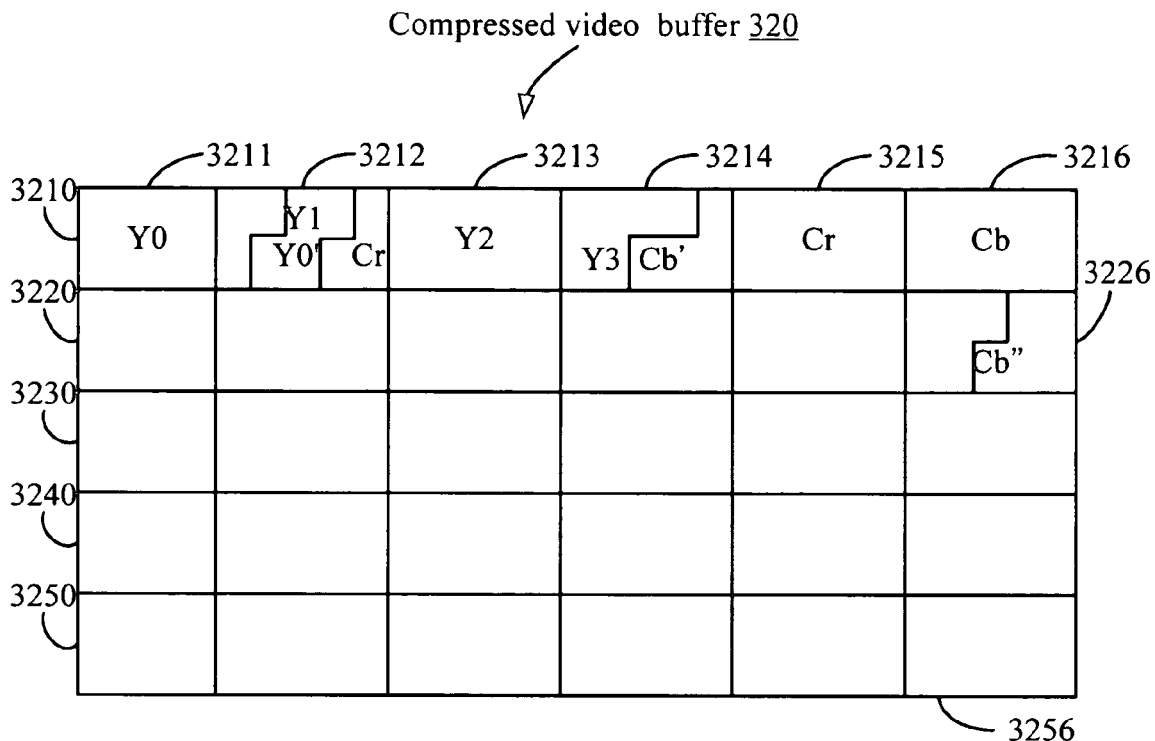
FIG. 4 is a schematic diagram showing a compressed video buffer according to the preferred embodiment of the invention.
FIG. 5 is a schematic diagram showing a pointer storage area according to the preferred embodiment of the invention.

Referring to FIG. 4, the compressed video buffer 320 stores a plurality of compressed video data, which has thirty data blocks 3211 to 3256 grouped into five compressed macroblocks 3210 to 3250. Each of the compressed macroblocks includes data associated with 4 luminance (Y0 to Y3) and 2 chroma difference (Cr and Cb) DCTs. Each of the luminance (Y0 to Y3) size is 14 bytes, and each of the chroma difference (Cr and Cb) size is 10 bytes. In the embodiment, the data blocks 3211 with brightness data Y0, the data blocks 3213 with brightness data Y2, and the data blocks 3215 with chroma data Cr of the compressed macroblock 3210 have complete data block which is 14 bytes respectively. The data block 3212 with brightness data Y1, the data block 3214 with brightness data Y3 and the data block 3216 with chroma data Cb include parts of them in different data blocks. Moreover, the data block 3216 and the data block 3226 are compressed inter-macroblocks.

Please refer to FIG. 5 with reference to FIG. 3 and FIG. 4, each block represents a data block which has its status indicated by the first pointer and the second pointer in the pointer storage area 350. If one of the data blocks of a macroblock has no space for filling any video stream, the data block is set as 0 by a first pointer. In other words, if the data block has space for filling other video streams, the data block is set as 1 by the first pointer. Moreover, if the rest space of the data blocks of the macroblock is 5 bytes, video stream with 10 bytes must be divided into different data blocks across inter-compressed macroblocks for storing and the data block is set as 0 by a second pointer. If one of the data blocks of the compressed macroblock has no space for filling any video segment, the data block is set as 0 indicated by a second pointer. In other words, if the data block has space for filling other video streams, the data block of the compressed inter-macroblock is set as 1 indicated by the second pointer. The pointer storage area 350 records the data block status by the first pointer and the second pointer according to the status of the data blocks of the compressed video buffer. In the embodiment, the value set by the first pointer or second pointer may be any number. In another embodiment, the status of the data blocks may set a start address and a ending address indicated by the first pointer and the second pointer.

Figure 6A:
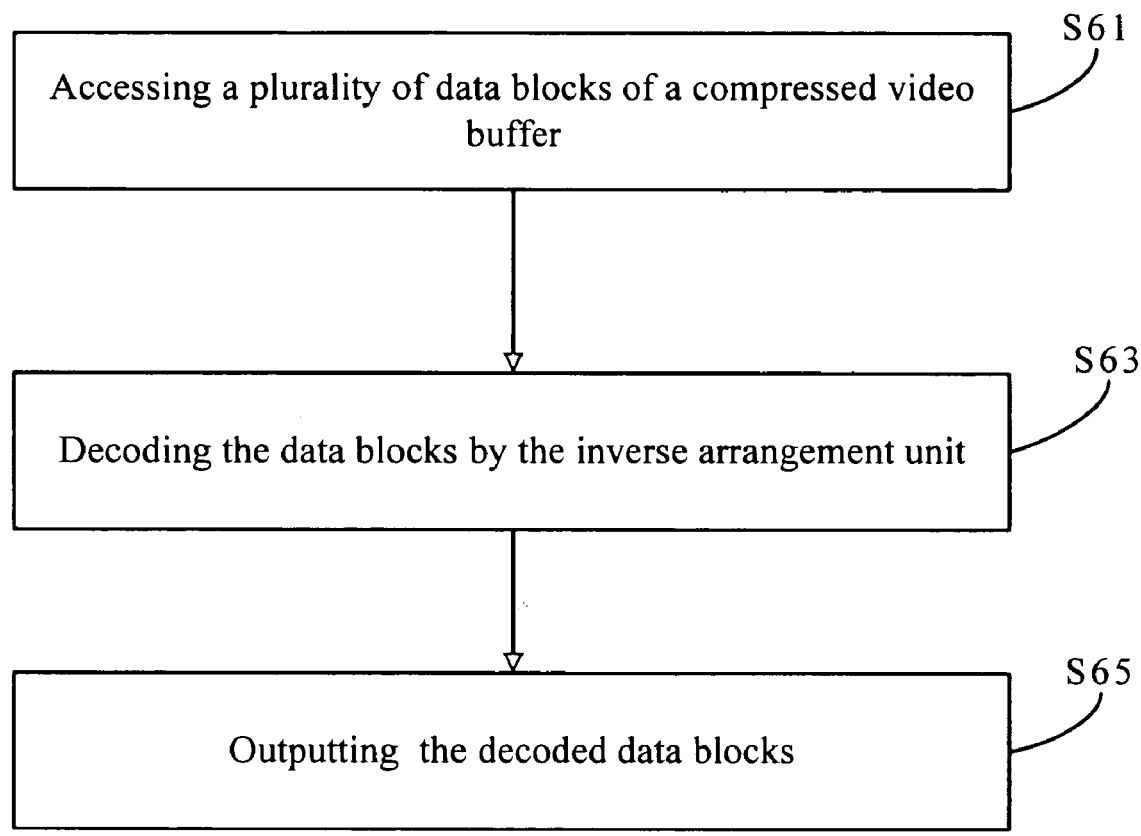
FIG. 6A is a flow chart showing the digital video decoding method for decoding a digital video according to one preferred embodiment of the invention.

FIG. 6A is a flow chart illustrating the method of decoding video. Referring to FIG. 6A with reference to FIG. 3, at step S61, a plurality of data blocks of the compressed video buffer 320 allocated in the first random access memory 330 is accessed by the parser 310. The data blocks are decoded by an inverse arrangement unit 340 at step S63. At step S65, the decoded data blocks are outputted by an inverse quantization unit and an inverse discrete cosine transform unit sequentially.

Figure 6B:
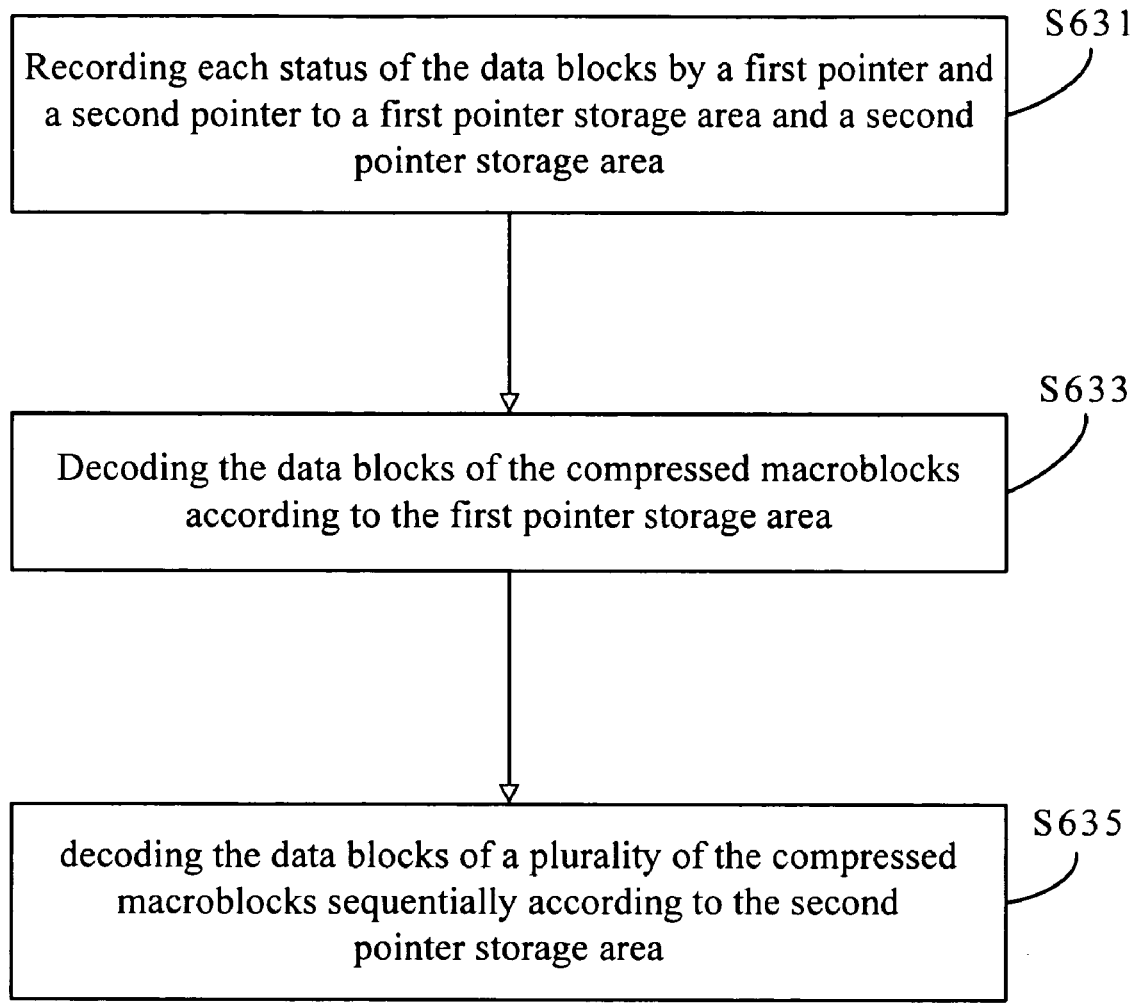
FIG. 6B is a flow chart showing a detailed procedure according to FIG. 6A of the invention.

As shown in FIG. 6B according to step S63 in FIG. 6A, each of the data blocks has its status indicated by the first pointer and the second pointer and recorded in the first pointer storage area 352 and the second pointer storage area 354 of the pointer storage area 340 at S631. At step S633, the data blocks of a plurality of compressed macroblocks are decoded according to the first pointer storage area 352 and then the data blocks of a plurality of compressed inter-macroblocks are decoded according to the second pointer storage area 354.

Above all, the present invention discloses a decoding method by a pointer. In prior art, the digital video system have a memory including larger space for storing decoded video data. A digital video decoding apparatus of the present invention includes a pointer storage area for storing status value of the data blocks indicated by a pointer instead of storing video size. The advantage of the present invention is reducing the memory size for storing significant number or significant address instead of storing video size.

Although the invention has been described with reference to specific embodiments, this description is not meant to be construed in a limiting sense. Various modifications of the disclosed embodiments, as well as alternative embodiments, will be apparent to persons skilled in the art. It is, therefore, contemplated that the appended claims will cover all modifications that fall within the true scope of the invention.

What is claimed is:

1. A method for decoding a digital video, comprising:
    decoding a plurality of data blocks in accordance with a plurality of pointer storage areas; and
    outputting the decoded data blocks to an inverse quantization unit and an inverse discrete cosine transform unit;
    wherein the plurality of pointer storage areas access a status of the data blocks of a plurality of compressed macroblocks indicated by a first pointer and a status of the data blocks of a plurality of compressed inter-macroblocks indicated by a second pointer;
    said status of each one of the data blocks of the plurality of compressed macroblocks and inter-macroblocks indicating the capacity to store a video stream;

wherein a status of 0 indicated by the first pointer, indicates the data block of the macroblock has no capacity to store a video stream, and a status of 1 indicated by the first pointer, indicates the data block of the macroblock has capacity to store a video stream; and wherein a status of 0 indicated by the second pointer, indicates the data block of the inter-macroblock has no capacity to store a video stream from one of the inter-macroblocks, and a status of 1 indicated by the second pointer, indicates the data block of the inter-macroblock has capacity to store a video stream from one of the inter-macroblocks.

2. The method of claim 1 further comprising:
decoding the data blocks of the compressed macroblocks according to the first pointer storage area indicated by the first pointer.

3. The method of claim 1 further comprising:
decoding the data blocks of the compressed inter-macroblocks according to the second pointer storage area indicated by the second pointer.

4. The method of claim 1, the step before decoding further comprising:
recording each status of the data blocks of the compressed macroblocks by the first pointer.

5. The method of claim 1, the step before decoding further comprising:
recording each status of the data blocks of the compressed inter-macroblocks by the second pointer.

6. The method of claim 1, wherein the status indicated by the first pointer and second pointer is a start address and an ending address.

7. A method for decoding a digital video, comprising:
decoding a plurality of data blocks of compressed macroblocks according to a first pointer storage area indicated by a first pointer and a plurality of data blocks of compressed inter-macroblocks according to a second pointer storage area indicated by a second pointer; and
outputting the decoded data blocks to an inverse quantization unit and an inverse discrete cosine transform unit;
said status of each one of the plurality data blocks of the compressed macroblocks and inter-macroblocks indicating the capacity to store a video stream;
wherein a status of 0 indicated by the first pointer, indicates the data block of the macroblock has no capacity to store a video stream, and a status of 1 indicated by the first pointer, indicates the data block of the macroblock has capacity to store a video stream; and wherein a status of 0 indicated by the second pointer, indicates the data block of the inter-macroblock has no capacity to store a video stream from one of the inter-macroblocks, and a status of 1 indicated by the second pointer, indicates the data block of the inter-macroblock has capacity to store a video stream from one of the inter-macroblocks.

8. The method of claim 7 the step before decoding further comprising:
recording each status of data blocks of the compressed macroblocks indicated by the first pointer to the first pointer storage area.

9. The method of claim 7 the step before decoding further comprising:
recording each status of data blocks of the compressed inter-macroblocks indicated by the second pointer to the second pointer storage area.

10. An apparatus for decoding a digital video, comprising:
a compressed video buffer coupled to a parser for accessing a plurality of compressed digital video data; and
an inverse arrangement unit coupled to the compressed video buffer for decoding the compressed digital video data;
wherein the inverse arrangement unit further comprises a pointer storage area for storing each status of data blocks and a variable length decode unit for decoding the compressed digital video data according to the pointer storage area;
said status of each one of the data blocks indicating the capacity to store compressed digital video data; and
wherein a status of 0 indicated by the pointer, indicates the data block has no capacity to store compressed digital video data, and a status of 1 indicated by the pointer, indicates the data block has capacity to store compressed digital video data.

11. The apparatus of claim 10, wherein the pointer storage area further comprises a first pointer storage area stored with each status of the data blocks of a plurality of macroblocks indicated by a first pointer.

12. The apparatus of claim 11, wherein the first pointer storage area may be implemented by FIFO queue.

13. The apparatus of claim 10, wherein the pointer storage area further comprises a second pointer storage area stored with each status of the data blocks of a plurality of macroblocks indicated by a second pointer.

14. The apparatus of claim 13, wherein the first pointer storage area may be implemented by FIFO queue.

* * * * *